Sept. 1, 1959   L. H. MORIN   2,902,234
PLASTIC SPOOL
Filed April 15, 1954   3 Sheets-Sheet 1
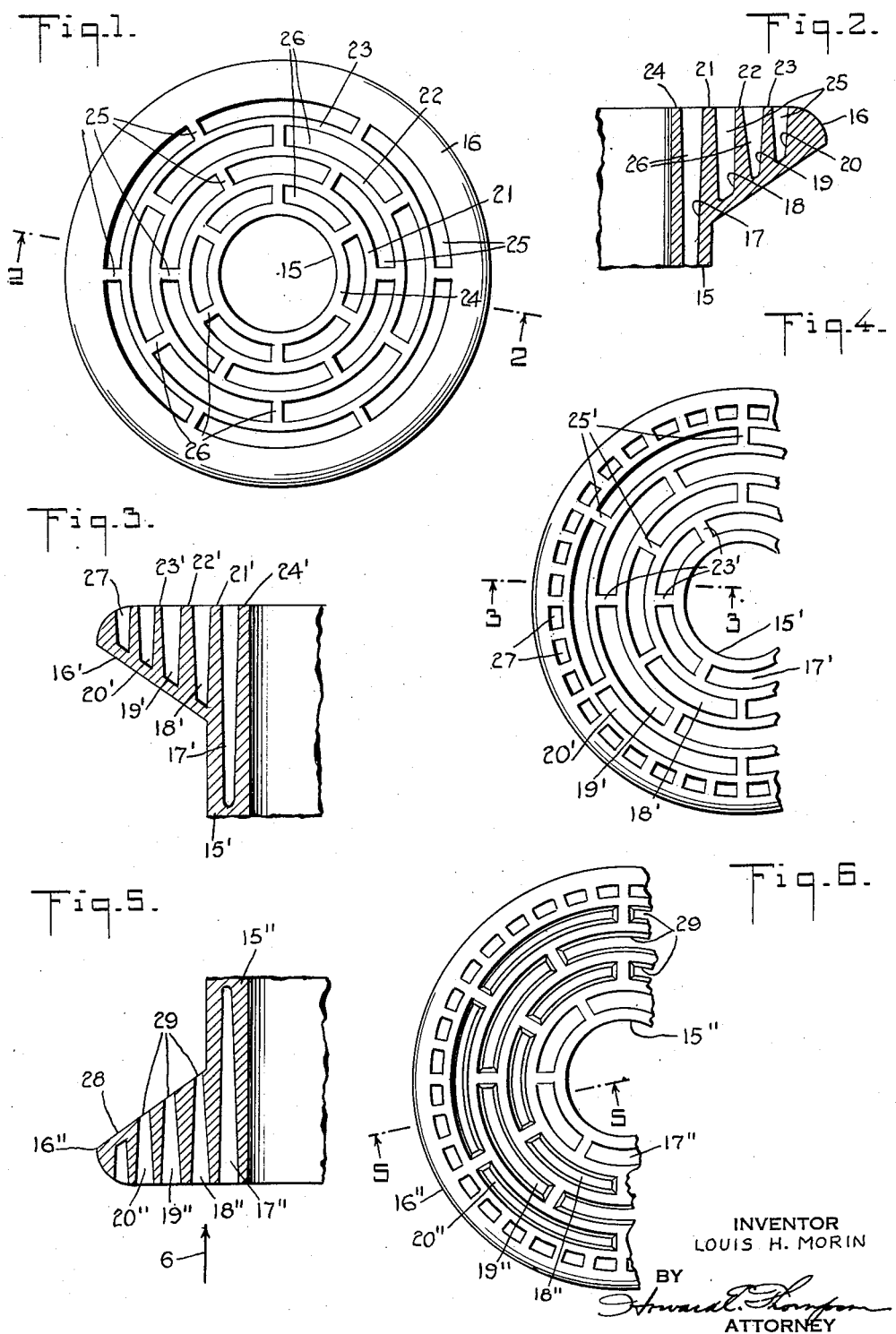
INVENTOR
LOUIS H. MORIN
BY
Howard T. Thompson
ATTORNEY Sept. 1, 1959 L. H. MORIN 2,902,234
PLASTIC SPOOL
Filed April 15, 1954 3 Sheets-Sheet 3

INVENTOR
LOUIS H. MORIN
BY
*Howard Thompson*
ATTORNEY

United States Patent Office 2,902,234
Patented Sept. 1, 1959

2,902,234

PLASTIC SPOOL

Louis H. Morin, Bronx, N.Y., assignor to Coats & Clark, Inc., New York, N.Y., a corporation of Delaware Application April 15, 1954, Serial No. 423,457

18 Claims. (Cl. 242—118.7)

This invention relates to moulded plastic spools, commonly referred to as thread spools, wherein the rimmed end portions of the spools are constructed so as to reduce the amount of plastic required for the spools, to form extended label supporting areas and, at the same time, to form a relatively lightweight spool structure.

More particularly, the invention deals with a spool structure, wherein the rimmed ends have a series of annular grooves spaced radially on said end, said grooves producing on the spool ends annular ring-like members with circumferentially spaced ribs joining the rings at spaced intervals.

Still more particularly, the invention deals with a novel core and die structure for forming spools of the kind under consideration.

The novel features of the invention will be best understood from the following description, when taken together with the accompanying drawing, in which certain embodiments of the invention are disclosed and, in which, the separate parts are designated by suitable reference characters in each of the views and, in which:

Fig. 1 is an end view of one form of spool which I employ.

Fig. 2 is a partial section on the line 2—2 of Fig. 1.

Fig. 3 is a view, similar to Fig. 2, showing a modified form of spool structure, the section being on the line 3—3 of Fig. 4.

Fig. 4 is a partial end view of the spool structure shown in Fig. 3.

Fig. 5 is a sectional view, similar to Fig. 3, of a modified form of spool, the section being on the line 5—5 of Fig. 6.

Fig. 6 is a view looking in the direction of the arrow 6 of Fig. 5 showing only part of the spool end.

Figure 7:
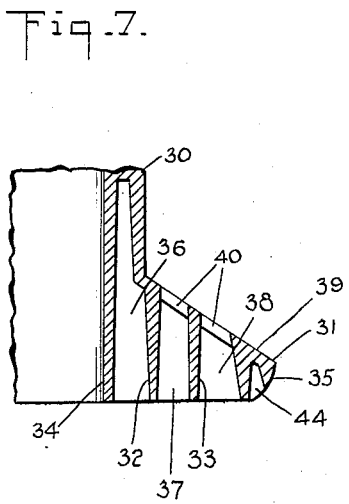
Fig. 7 is a view, similar to Figs. 2, 3 and 5, illustrating a modified form of spool.

In Figs. 1 and 2 of the drawing, I have shown one form of moulded plastic spool, comprising a central tubular portion 15, having outwardly flared rim ends, one only of which is shown at 16 in Fig. 2 of the drawing, it being understood that both ends of the spool are of the same structure. This is also true in the several forms of construction, later described.

The rim end portion of the spool has a series of annular grooves 17, 18, 19 and 20. While four grooves are shown in the present illustration, it will be apparent that more or less annular grooves can be employed. These annular grooves are divided by circumferential or annular ring-like walls 21, 22 and 23 and an extension 24 on the tubular portion 15 of the spool. The annular walls are joined and reinforced by circumferentially spaced ribs, divided into two groups, namely radially alined ribs 25 and radially alined ribs 26 spaced circumferentially with respect to the ribs 25. These ribs join the annular wall portion and the outer edge of the rim in the manner clearly illustrtaed in Fig. 1 of the drawing. The ribs 25, 26, together with the walls 21–24 form, at the end of the spool, widespread surfaces for support of labels which can be secured to said ends in any desired manner. Walls 21–24 taper in thickness toward their free ends.

In Figs. 3 and 4 of the drawing, I have shown a slight modification of the structure shown in Figs. 1 and 2 and, in these figures, 15' represents the center tubular portion; 16' the rim; 17', 18', 19' and 20' the annular grooves, similar to the grooves 17–20; and at 21', 22' and 23' the annular walls, similar to the walls 21–23; 24' the outward extension of the tubular portion 15'. Aside from the depth of the groove 17', the only difference in the two structures is in the inclusion of the circumferentially spaced small apertures 27 in the outer edge of the rim 16' or, in other words, outwardly of the annular groove 20'. The spool shown in Figs. 3 and 4 also includes the circumferentially spaced, radially alined ribs 25', 26', similar to the rigs 25, 26.

In Figs. 5 and 6 of the drawing is shown another slight modification of the spool structure shown in Figs. 3 and 4. Accordingly, it is not deemed necessary to specifically repeat the description of the various parts or structures but, for purposes of identification, the tubular portion will be identified by the reference character 15" and the rim as 16". Here, the sole modification resides in opening the grooves 18", 19" and 20" through the inner bevelled surface 28 of the rim 16", as clearly noted at 29, these openings also being illustrated in Fig. 6 of the drawing. Otherwise, the structure of Figs. 5 and 6 is identical with the structure shown in Figs. 3 and 4. It is apparent that the ribs as well as the walls taper in thickness in the direction of their free ends.

Figure 8:
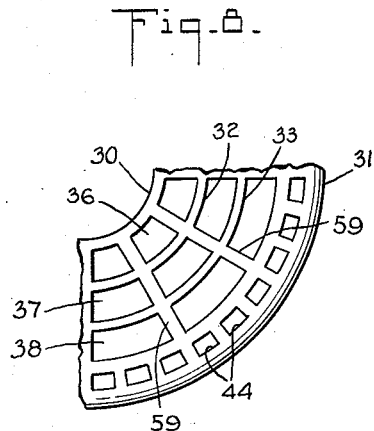
Fig. 8 is a partial end view of the structure shown in Fig. 7.

In Figs. 7 and 8 of the drawing, I have shown a modified form of spool having a central tubular portion 30 and outwardly extending rim 31. Here, the rim has two circumferential wall portions 32 and 33 which form, in conjunction with the reduced extension 34 of the tube 30 and the outer peripheral portion 35 of the rim, three annular grooves 36, 37 and 38. The grooves 37 and 38 open through the inner bevelled surface 39 of the rim 35, as seen at 40. The outer rim portion is provided with circumferentially spaced apertures or recesses 44.

Figure 9:
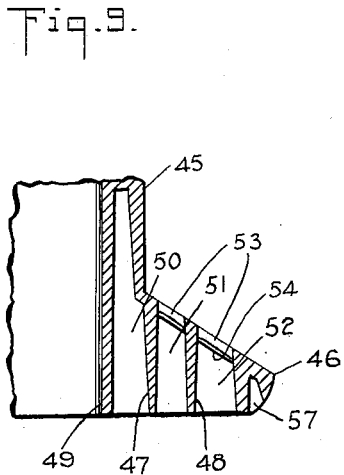
Figs. 9 and 10 are views similar to Figs. 7 and 8 and showing another modification.
Figure 10:
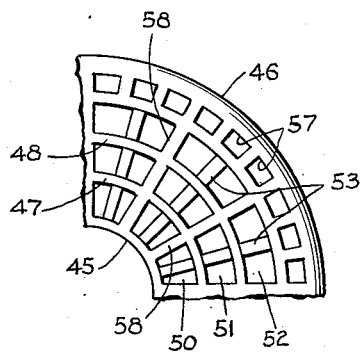

In Figs. 9 and 10 of the drawing, I have shown a slight modification of the structure shown in Figs. 7 and 8. In these figures, 45 represents the tubular portion of a spool, generally similar to the tubular portion 30; 46 the outwardly extending rim of the spool; 47 and 48 annular walls, similar to the walls 32 and 33; 49 an extension to the tube 45, similar to the extension 34; and at 50, 51 and 52 annular grooves, similar to the grooves 36, 37 and 38.

In Figs. 9 and 10, the openings, which would be equivalent to the openings 40 of Figs. 7 and 8, include radial ribs 53 having rounded inner surfaces 54, as clearly noted in Fig. 9. The ribs 53 are clearly shown in Fig. 10 of the drawing. It will also appear that the rim 46 has circumferentially spaced apertures 57 which are similar to the apertures 44.

The ribs 53 are located centrally between radial ribs 58, the latter ribs being similar to the radial ribs shown in Fig. 8 of the drawing and said radial ribs in Fig. 8 are identified by the reference character 59. In this connection, it will be apparent that the ribs 58 and 59 are generally similar to the ribs 25, 26, 25', 26' shown in Figs. 1 to 4, inclusive, with the exception that all of the ribs 58 and 59 are in common alinement in joining the annular walls; whereas, in Figs. 1 to 4, inclusive, these radial ribs are circumferentially spaced. It will also be apparent that the ribs 53 are disposed only at the inner bevelled portion of the rim and do not extend to the end surface of the spool.

Figure 11:
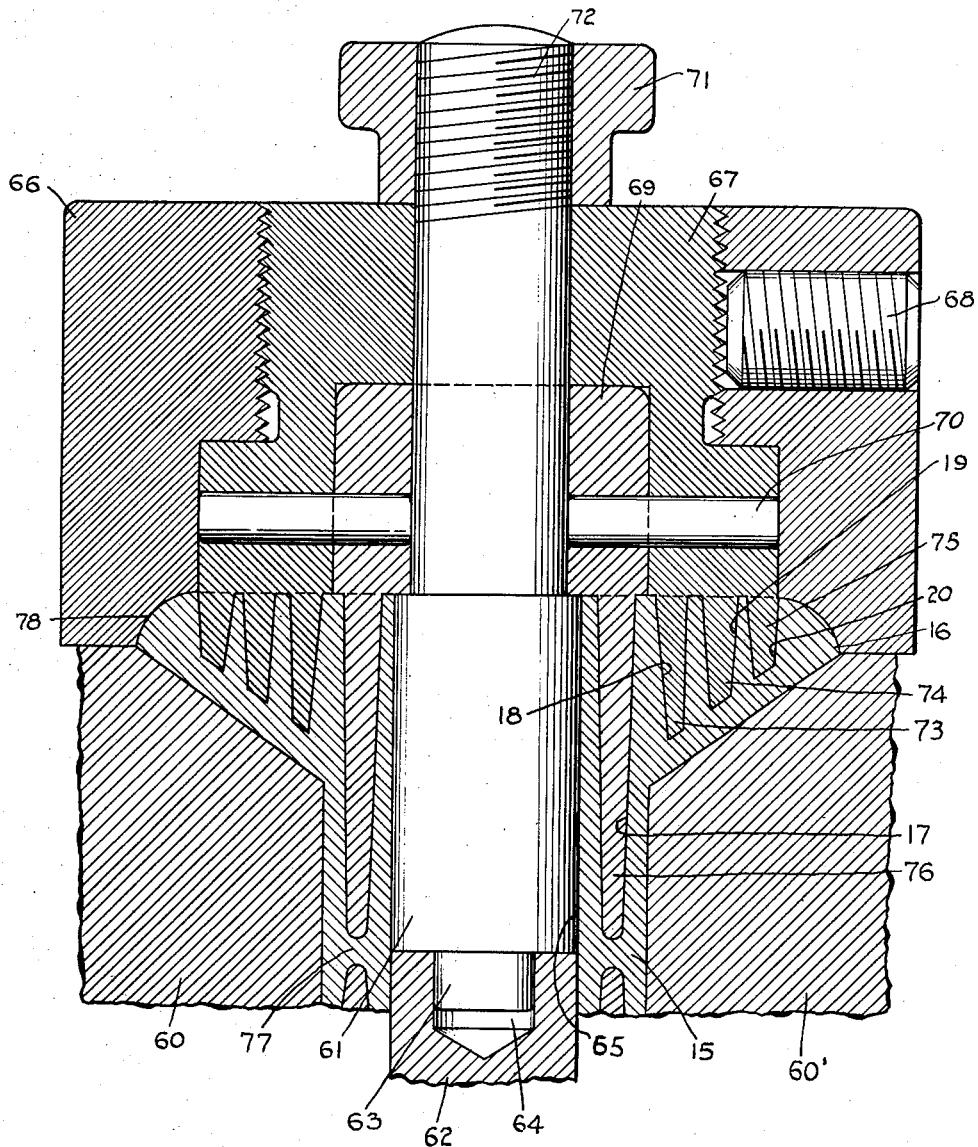
Fig. 11 is an enlarged diagrammatic sectional view through the core and dies and illustrating the method of forming a spool thereby.

All of the spool structures disclosed in Figs. 1 to 10, inclusive, are adapted to be moulded in a die and core structure, generally similar to that shown in Fig. 11 of the drawing, it being understood that the dies and cores will be modified to suit the different contours in the spool structures to be formed.

In Fig. 11, 60, 60' represent a pair of dies, in the central portion of which is supported a core comprising two core pin portions 61 and 62, the pin 61 having a reduced extension 63 fitting in a corresponding recess 64 in the pin 62 for alining the pins one with respect to the other, the pins forming the bore 65 of the tubular portion of the spool to be formed. In illustrating one adaptation and use of the die and core structure, a spool, similar to that shown in Figs. 1 and 2, is illustrated; thus 15 will represent the tubular portion of the spool, the bore 55 of which is formed by said core pins 61, 62.

At 66 is shown a core supporting block, in which a core element 67 is adjustably fixed through the medium of a set screw 68. The core element 67 includes a supplemental core part 69. The element 67 and part 69 are keyed together and to the core pin 61 by a transverse key 70. The core pin 61 is further supported in the core element 67 by a nut 71 engaging a threaded end 72 of said core pin.

At this time, it would be well to state that the showing in Fig. 11 of the drawing represents one end portion only of a die core structure, the other end portion being the same and, for this reason, the double showing is not deemed to be necessary.

The core element 67 has three projecting circumferentially spaced curved and tapered core fingers 73, 74 and 75 which form the grooves 18, 19 and 20 of the resulting spool, as clearly noted in Figs. 1 and 2. The core part 69 has a series of circumferentially spaced longer curved and tapered core fingers 76 which form the grooves 17 of the resulting spool, again, as noted in Figs. 1 and 2. It will be noted that the fingers 73–75 gradually decrease in length to conform with the contour of the spool rim 16. In this connection, it will be apparent that, in referring to the annular grooves in the different forms of spool structures described, these grooves are annular with the exception of the radial ribs employed for joining the annular walls and for providing the added surface area at the spool ends for mounting of the labels.

It will also appear from a consideration of Fig. 11 of the drawing that the long core fingers 76 terminate short of the central portion of the resulting spool to be formed, which leaves a circumferentially continuous annular wall 77 centrally of the spool structure, as clearly noted in said figure. It will also be apparent that the rim portion 16 of the spool is partially formed by the dies 60, 60' and by the cavity portion 78 of the core supporting block 66. Thus, from this standpoint, the core supporting block actually forms part of the die structure.

For purposes of description, the central tubular portion of the several spools can be said to comprise an inner cylinder and an outer barrel; the ribs, for example, part of the ribs 26, Fig. 1, forming radial walls joining the barrel with the cylinder. Still further, the rim portions of the several spools disclosed may be said to comprise outwardly extending flange portions on the barrel, these and/or the rims forming the deep grooves of the spool body. It will also appear from a consideration of Figs. 1, 4, 6, 8 and 10 that the ring-like walls, in conjunction with the radial ribs, form circumferentially and radially spaced elongated openings at the spool ends. The spool structures, as disclosed in the several figures, may be seen to comprise deep grooved spool bodies for reception of a substantial amount of thread or other strand to be wound therearound.

Summarizing further the various spool modifications, it will be apparent that each is a one-piece, integrally formed, all-plastic spool characterized by the presence of weight-reducing, material-saving spaces. The rims or rim ends are readily nicked to provide thread-holding nicks resistant to chipping or breaking away. More particularly, each spool comprises a barrel having a pair of flanged end portions. When viewed in cross-section, the barrel comprises an annular wall of substantial thickness; note, for example, the portion in Fig. 3 touched by the tie line of 15'. A central bore extends longitudinally of the spool and opens through each end face. Each flanged end portion comprises an outer rim portion, such as 16 of Figs. 1–2, of larger diameter than the barrel and joined to the latter through an intermediate wall portion of progressively decreasing diameter, such as the bevelled surface indicated at 28 of Fig. 5. A plurality of concentric annular grooves in each flanged end portion extend from the end face thereof inwardly for substantial but varying depths. Between each pair of adjacent grooves an annular wall is formed, and an annular wall is also formed between the innermost groove and the bore. The innermost groove extends into the annular wall of the barrel for a distance less than half the length of the barrel and the remaining or outer grooves extend toward the intermediate wall portion. In Figs. 5–6, 7–8, and 9–10, some of the outer grooves, note 18", 19", and 20" of Fig. 5, extend not only toward but through the intermediate wall portion. The annular walls of each adjacent pair of walls are connected to each other by a plurality of circumferentially spaced, radially disposed ribs, with each rib being located in a groove and being coextensive in length with the depth of the groove. In Figs. 1–2, and generally in Figs. 3–4 and 5–6, the ribs connecting one pair of adjacent, annular walls are staggered with respect to the ribs connecting the next adjacent pair of walls. As is evident, the outer or free ends of the annular walls and ribs of each flanged end portion lie in the end face of the spool, and serve to support a ticket label, the latter being secured to the spool in any desired way.

Having fully described my invention, what I claim as new and desire to secure by Letters Patent is:

1. A unitary moulded spool body, comprising a central tubular portion, outwardly extending end rims, said rims having circumferentially continuous ring-like walls spaced radially on each end, said walls being joined by circumferentially spaced radial ribs forming, in the ends of the spool body, circumferentially and radially spaced openings, and said tubular portion, ring-like walls and ribs having alined outer surfaces at the spool ends.

2. A unitary moulded spool body, comprising a central tubular portion, outwardly extending end rims, said rims having circumferentially continuous ring-like walls spaced radially on each end, said walls being joined by circumferentially spaced radial ribs forming, in the ends of the spool body, circumferentially and radially spaced openings, said tubular portion, ring-like walls and ribs having alined outer surfaces at the spool ends, the outer extremity of the rims being of heavy wall structure, and the heavy wall structure of the rims having circumferentially spaced apertures opening through the ends of said rims.

3. A unitary moulded spool body, comprising a central tubular portion, outwardly extending end rims, said rims having circumferentially continuous ring-like walls spaced radially on each end, said walls being joined by circumferentially spaced radial ribs forming, in the ends of the spool body, circumferentially and radially spaced grooves, said tubular portion, ring-like walls and ribs having alined outer surfaces at the spool ends, and some of the grooves in said ends opening through inner surfaces of the rims.

4. A unitary moulded spool body, comprising a central tubular portion, outwardly extending end rims, said rims having circumferentially continuous ring-like walls spaced radially on each end, said walls being joined by circumferentially spaced radial ribs forming, in the ends of the spool body, circumferentially and radially spaced grooves, said tubular portion, ring-like walls and ribs having alined outer surfaces at the spool ends, and said grooves opening through said inner surfaces of the rims.

5. A unitary moulded spool body, comprising a central tubular portion, outwardly extending end rims, said rims having circumferentially continuous ring-like walls spaced radially on each end, said walls being joined by circumferentially spaced radial ribs forming, in the ends of the spool body, circumferentially and radially spaced apertures, said tubular portion, ring-like walls and ribs having alined outer surfaces at the spool ends, opposed walls of the apertures of said ends being tapered in thickness in the direction of the free ends thereof, said apertures opening through said inner surfaces of the rims, and ribs bridging the apertures where they open through inner surfaces of the rims.

6. A unitary moulded spool body, comprising a central tubular portion, outwardly extending end rims, said rims having circumferentially continuous ring-like walls spaced radially on each end, said walls being joined by circumferentially spaced radial ribs forming, in the ends of the spool body, circumferentially and radially spaced grooves, said tubular portion, ring-like walls and ribs having alined outer surfaces at the spool ends, said grooves opening through said inner surfaces of the rims, ribs bridging the grooves where they open through inner surfaces of the rims, and the outer portion of the rims having circumferentially spaced apertures opening through the ends of said spool body.

7. A deep rimmed unitary moulded spool body of the character described, said body comprising a central tubular portion and outwardly flared and extending rim ends, said tubular portion and rim ends having circumferentially spaced apertures divided by circumferentially spaced ribs, said ribs having end surfaces collectively adapted to support end ticket labels thereon, all of said apertures opening through the spool ends, and the apertures of said rims being in the form of a plurality of radially spaced groups.

8. A deep rimmed unitary moulded spool body of the character described, said body comprising a central tubular portion and outwardly flared and extending rim ends, said tubular portion and rim ends having circumferentially spaced apertures divided by circumferentially spaced ribs, said ribs having end surfaces collectively adapted to support end ticket labels thereon, all of said apertures opening through the spool ends, the apertures of said rims being in the form of a plurality of radially spaced groups, and the ribs dividing the radially spaced apertures of one group being staggered circumferentially with respect to the ribs in another group.

9. A deep rimmed unitary moulded spool body of the character described, said body comprising a central tubular portion and outwardly flared and extending rim ends, said tubular portion and rim ends having circumferentially spaced apertures divided by circumferentially spaced ribs, all of said apertures opening through the spool ends, said apertures of the rims being partially formed by circumferentially continuous radially spaced walls, and said walls, ribs and central tubular portion having alined surfaces at the spool ends.

10. A one-piece, integrally formed, all-plastic thread spool comprising a barrel having a pair of flanged end portions, a central bore extending longitudinally of the spool and opening through each end face, said barrel, when viewed in cross-section, comprising an annular wall portion of substantial thickness, each said flanged end portion comprising an outer rim portion of larger diameter than the barrel and joined to the latter through an intermediate wall portion of progressively decreasing diameter, a plurality of concentric annular grooves in each flanged end portion extending from the end face thereof inwardly for substantial but varying depths, an annular wall formed between each pair of adjacent grooves, the innermost groove extending into the annular wall of the barrel for a distance less than half the length of the barrel and the remaining grooves extending toward said intermediate wall portion, adjacent annular walls being connected to one another by a plurality of circumferentially spaced, radially disposed ribs, each rib being located in a groove and being coextensive in length with the depth of said groove and the free ends of said walls and ribs lying in the end face of said flanged end portion.

11. A one-piece, integrally formed, all-plastic thread spool comprising a barrel having a pair of flanged end portions, a central bore extending longitudinally of the spool and opening through each end face, said barrel, when viewed in cross-section, comprising an annular wall of substantial thickness, each said flanged end portion comprising an outer rim portion of larger diameter than the barrel and joined to the latter through an intermediate wall portion of progressively decreasing diameter, a plurality of concentric annular grooves in each flanged end portion extending from the end face thereof inwardly for substantial but varying depths, an annular wall between each pair of adjacent grooves, the innermost groove extending into the annular wall of the barrel and the remaining grooves extending toward said intermediate wall portion, and the free ends of said walls lying in the end face of said flanged end portion.

12. A light-weight, one-piece, deep grooved, all-plastic thread spool comprising a central tubular portion having a pair of flanged end portions, each said flanged end portion terminating in and end face of the spool; said tubular portion having an outer surface for receiving thread and a central bore extending longitudinally of the spool and opening through each end face, said tubular portion, when viewed in cross-section, comprising an annular wall portion of substantial thickness; each said flanged end portion comprising an outer rim portion of substantially larger diameter than the tubular portion and joined to the outer surface of the latter through a bevelled wall, a plurality of weight-reducing, plastic-saving, concentric annular grooves in each flanged end portion opening through said end face, the innermost groove extending into the annular wall portion of said tubular portion for a distance of less than half the length of the tubular portion and the remaining grooves extending toward said bevelled wall; a concentric annular wall between each pair of adjacent grooves, each adjacent pair of said annular walls being connected to each other by a plurality of circumferentially spaced, radially extending ribs, each rib being disposed in a groove and being coextensive in length with the depth thereof, the ribs of each groove serving to divide said groove into a plurality of circumferentially spaced, smaller grooves; and the free ends of said tubular portion, annular walls, and ribs of each flanged end portion lying in said end face.

13. The spool of claim 12 wherein said outer rim portion adjacent the periphery thereof has a plurality of circumferentially spaced apertures which open through said end face, each said aperture being of substantially shorter length than the length of one of said circumferentially spaced smaller grooves, said apertures further reducing the amount of plastic required for the spool, further reducing the weight thereof, and providing a decorative appearance for said spool.

14. The spool of claim 12 wherein said grooves extending toward said bevelled walls are closed off by said bevelled wall.

15. The spool of claim 12 wherein said grooves extending toward said bevelled wall open therethrough.

16. The spool of claim 12 wherein the ribs connecting one pair of adjacent, annular walls are staggered with respect to the ribs connecting the next adjacent pair of walls.

17. The spool of claim 12 wherein each rib connecting one pair of adjacent, annular walls is radially alined with a rib connecting the other pairs of adjacent, annular walls.

18. The spool of claim 17 wherein a plurality of radially extending ribs are disposed in the bevelled wall and connect said annular walls.

References Cited in the file of this patent

UNITED STATES PATENTS

| | | |
|---|---|---|
| 2,264,116 | Howsam | Nov. 25, 1941 |
| 2,276,380 | English | Mar. 17, 1942 |
| 2,374,292 | Kuna | Apr. 24, 1945 |
| 2,465,573 | Brannon | Mar. 29, 1949 |

FOREIGN PATENTS

| | | |
|---|---|---|
| 459,210 | Italy | Sept. 1, 1950 |
| 419,617 | Great Britain | Nov. 15, 1934 |
| 705,314 | Great Britain | Mar. 10, 1954 |
| 265,489 | Switzerland | Sept. 16, 1950 |